United States Patent
Suh et al.

(10) Patent No.: US 11,537,257 B2
(45) Date of Patent: *Dec. 27, 2022

(54) MOBILE TERMINAL PROVIDING CONTENT RELATED TO BEVERAGE-MAKING OF A BEVERAGE-MAKING APPARATUS AND A RECORDING MEDIUM RECORDING A PROGRAM PERFORMING A METHOD OF PROVIDING THE CONTENT

(71) Applicant: LG Electronics Inc., Seoul (KR)

(72) Inventors: Mina Suh, Seoul (KR); Hyungsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 125 days.

This patent is subject to a terminal disclaimer.

(21) Appl. No.: 17/078,845

(22) Filed: Oct. 23, 2020

(65) Prior Publication Data

US 2021/0041990 A1    Feb. 11, 2021

Related U.S. Application Data

(63) Continuation of application No. 15/806,451, filed on Nov. 8, 2017, now Pat. No. 10,852,900.

(30) Foreign Application Priority Data

Nov. 10, 2016  (KR) ........................ 10-2016-0149575

(51) Int. Cl.
*G06F 3/0481*    (2022.01)
*A47J 31/44*    (2006.01)
(Continued)

(52) U.S. Cl.
CPC ............ *G06F 3/0481* (2013.01); *A47J 31/44* (2013.01); *C12C 13/10* (2013.01); *G06Q 20/12* (2013.01);
(Continued)

(58) Field of Classification Search
CPC .............. G06F 3/0481; G06F 17/0064; H04M 1/72412; A47J 31/44; A47J 31/521;
(Continued)

(56) References Cited

U.S. PATENT DOCUMENTS 9,109,192 B1    8/2015  Mitchell et al.
9,499,385 B1 *  11/2016  Studor .................. A47J 31/405
(Continued)

FOREIGN PATENT DOCUMENTS

KR    20020070938 A    9/2002
KR    1020150131599    11/2015
KR    1020160124508    10/2016

OTHER PUBLICATIONS

[Kelly] [online], "PicoBrew: A First Look," Nov. 2, 2016, retrieved on Jul. 6, 2021, <https://www.youtube.com/watch?v=3fk1FRuOES8>, 1 page [Video Submission].

(Continued)

*Primary Examiner* — Daniel Samwel
(74) *Attorney, Agent, or Firm* — Fish & Richardson P.C.

(57) ABSTRACT

A mobile terminal includes: a wireless communication unit configured to communicate with a beverage-making apparatus; a display unit; and at least one processor. The at least one processor is configured to: receive, through the wireless communication unit, beverage-making state information indicating a state of the beverage-making apparatus; and generate content to be output through the display unit, based on the received beverage-making state information of the beverage-making apparatus.

20 Claims, 16 Drawing Sheets

(51) Int. Cl.
  *G07F 13/06* (2006.01)
  *C12C 13/10* (2006.01)
  *A47J 31/52* (2006.01)
  *G06Q 20/12* (2012.01)
  *G07F 17/00* (2006.01)
  *H04M 1/72412* (2021.01)

(52) U.S. Cl.
  CPC ........ *G07F 13/065* (2013.01); *G07F 17/0064* (2013.01); *H04M 1/72412* (2021.01); *A47J 31/52* (2013.01); *A47J 31/521* (2018.08); *A47J 31/525* (2018.08); *A47J 31/5253* (2018.08)

(58) Field of Classification Search
  CPC ...... A47J 31/5253; A47J 31/525; A47J 31/52; A47J 31/5251; G06Q 20/12; G07F 13/065
  See application file for complete search history.

(56) References Cited

U.S. PATENT DOCUMENTS

| | | | |
|---|---|---|---|
| 2002/0139839 A1* | 10/2002 | Catan | G06F 16/38 707/E17.112 |
| 2003/0079613 A1 | 5/2003 | Williamson | |
| 2010/0129490 A1 | 5/2010 | Williams et al. | |
| 2012/0102993 A1 | 5/2012 | Hortin | |
| 2014/0017354 A1 | 1/2014 | Joseph et al. | |
| 2014/0172894 A1* | 6/2014 | Argue | G06Q 30/02 707/758 |
| 2014/0214590 A1* | 7/2014 | Argue | G06Q 30/0631 705/26.7 |
| 2015/0008530 A1 | 1/2015 | Park et al. | |
| 2015/0032555 A1 | 1/2015 | Jones | |
| 2015/0113262 A1* | 4/2015 | Kamal | A61B 5/7275 713/100 |
| 2015/0142621 A1 | 5/2015 | Gray et al. | |
| 2015/0305551 A1* | 10/2015 | Rosati | A47J 31/56 99/280 |
| 2016/0076906 A1* | 3/2016 | Hinnegan | G01C 21/3415 701/408 |
| 2016/0201018 A1 | 7/2016 | Watson et al. | |
| 2016/0222334 A1 | 8/2016 | Yang et al. | |
| 2016/0257554 A1 | 9/2016 | Manwani et al. | |
| 2016/0367072 A1 | 12/2016 | Boone et al. | |
| 2017/0119195 A1* | 5/2017 | Al-Shaibani | A47J 31/404 |
| 2017/0295983 A1 | 10/2017 | Tseng | |
| 2017/0344950 A1* | 11/2017 | Dhagumudi | G06Q 30/0621 |
| 2018/0082550 A1* | 3/2018 | Read | G08B 3/10 |
| 2018/0325307 A1 | 11/2018 | Stasch et al. | |

OTHER PUBLICATIONS

EP Summons to Attend Oral Proceedings in European Appln. No. 17200807.0, dated Apr. 7, 2021, 12 pages.

KR Office Action in Korean Appln. No. 10-2020-0047901, dated May 20, 2021, 10 pages (with English Translation).

European Office Action in European Application No. 17200807.0, dated Jul. 24, 2019, 7 pages.

Extended European Search Report in European Application No. 17200807.0, dated Dec. 20, 2017, 8 pages.

Korean Notice of Allowance in Korean Application No. 10-2016-0149575, dated Mar. 28, 2020, 12 pages (with English translation).

* cited by examiner

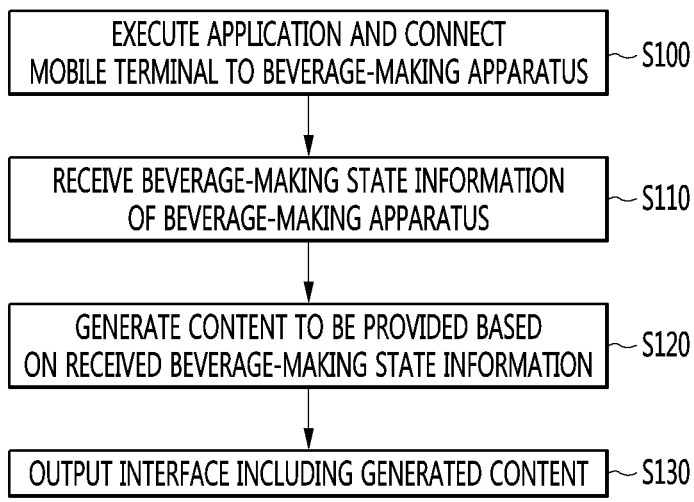
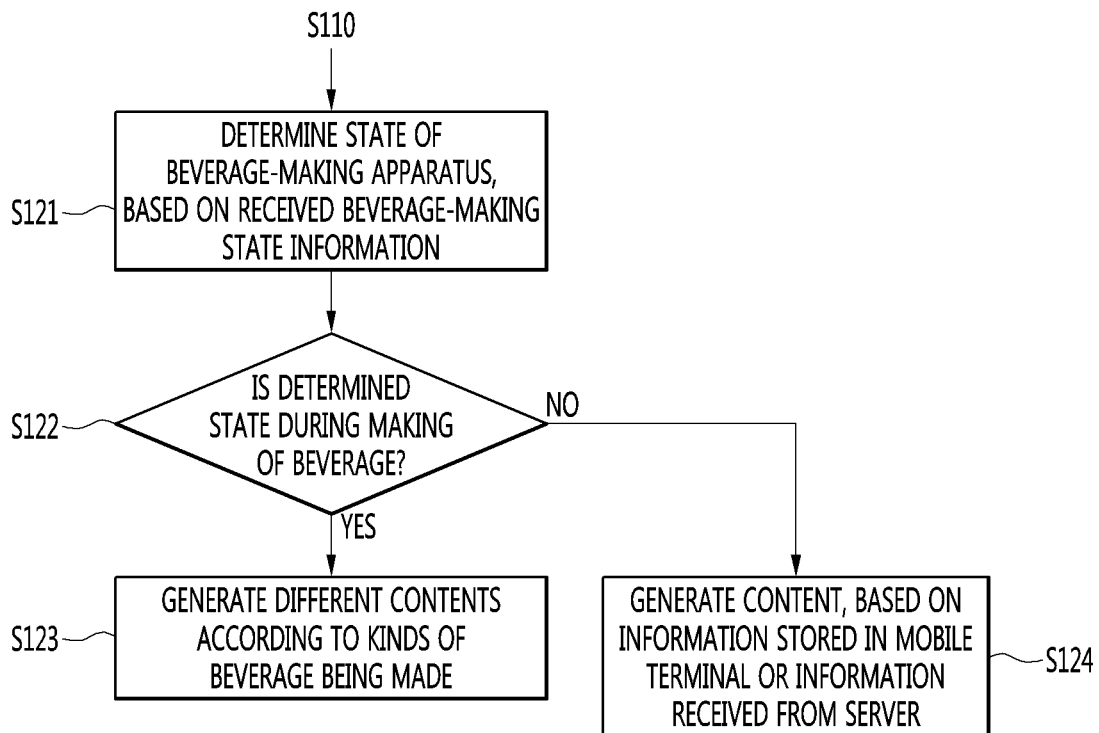

MOBILE TERMINAL PROVIDING CONTENT RELATED TO BEVERAGE-MAKING OF A BEVERAGE-MAKING APPARATUS AND A RECORDING MEDIUM RECORDING A PROGRAM PERFORMING A METHOD OF PROVIDING THE CONTENT

CROSS-REFERENCE TO RELATED APPLICATIONS

This application is a continuation of U.S. application Ser. No. 15/806,451, filed on Nov. 8, 2017, which claims priority under 35 U.S.C. 119 and 365 to Korean Patent Application No. 10-2016-0149575, filed on Nov. 10, 2016, in the Korean Intellectual Property Office, the disclosures of which are incorporated herein by reference in their entirety.

TECHNICAL FIELD

The present disclosure generally relates to a mobile terminal, and more particularly, to a mobile terminal that is communicative with a beverage-making apparatus and provides information related to beverage-making operations of the beverage-making apparatus.

BACKGROUND

Beer is an alcoholic beverage brewed by filtering wort made with malt made from germinated barley, adding hops to the wort, and then fermenting the wort with yeast.

Various types of beverages are made via fermentation. Such beverages are typically made using ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Ingredients for brewing beer typically include water, malt, hops, yeast, flavor additives, and the like. The yeast is often referred to as leaven, and is typically added to malt to induce fermentation. The yeast may also facilitate the generation of alcohol and carbon dioxide (or carbonic acid). In some scenarios, flavor additives are added that improve the taste of beer, such as fruit, syrup, and vanilla bean additives.

SUMMARY

Implementations described herein provide a mobile terminal configured to provide various types of information based on an operation state of a beverage-making apparatus.

In one aspect, a mobile terminal includes: a wireless communication unit configured to communicate with a beverage-making apparatus; a display unit; and at least one processor. The at least one processor is configured to: receive, through the wireless communication unit, beverage-making state information indicating a state of the beverage-making apparatus; and generate content to be output through the display unit, based on the received beverage-making state information of the beverage-making apparatus.

In some implementations, the beverage-making state information includes information related to whether the beverage-making apparatus is currently performing a beverage-making process.

In some implementations, the beverage-making state information indicates that the beverage-making apparatus is in one of a first state that is prior to the beverage-making process, a second state that is during the beverage-making process, or a third state that is after the beverage-making process.

In some implementations, the at least one processor is configured to, based on the beverage-making state information indicating that the beverage-making apparatus is in the first state prior to the beverage-making process: generate the content to include first content for guiding the beverage-making process, based on information that is stored in the mobile terminal or that is received from at least one computer communicative with the mobile terminal; and display the generated first content through the display unit.

In some implementations, the at least one processor is configured to generate the first content for guiding the beverage-making process, based on the information that is stored in the mobile terminal or that is received from at least one computer communicative with the mobile terminal by: calculating a beverage-making start term, based on a start date of schedule information that is stored in the mobile terminal or that is received from the at least one computer; and generate the first content including the calculated beverage-making start term.

In some implementations, based on the beverage-making state information indicating that the beverage-making apparatus is in the second state that is during the beverage-making process, the beverage-making state information further includes at least one of information regarding a type or an ingredient of the beverage being made, or information regarding a beverage-making progress degree of the beverage. The at least one processor is configured to, based on the beverage-making state information indicating that the beverage-making apparatus is in the second state that is during the beverage-making process: generate the content depending on the type of the beverage being made in the beverage-making process and depending on at least one of the ingredient of the beverage being made or the beverage-making progress degree of the beverage indicated in the beverage-making state information; and display the generated content through the display unit.

In some implementations, the at least one processor is configured to, based on the beverage-making state information indicating that the beverage-making apparatus is in the second state that is during the beverage-making process: generate the content to include second content regarding food that is matched to the beverage being made or information regarding the beverage-making progress degree; and display the generated second content through the display unit.

In some implementations, the at least one processor is configured to, based on the beverage-making state information indicating that the beverage-making apparatus is in the third state that is after the beverage-making process: transmit, to at least one computer connected to the mobile terminal, information regarding the beverage-making process that is generated after the beverage-making process has completed.

In some implementations, the least one processor is configured to, based on the beverage-making state information indicating that the beverage-making apparatus is in the third state that is after the beverage-making process: generate the content to include at least one of first content related to a review of the beverage made during the beverage-making process, second content for guiding a user to purchase at least one ingredient for the beverage made during the beverage-making process, or third content related to a beverage-making history of the user; and display the generated content including at least one of the first content, the second content, or the third content through the display unit.

In another aspect, at least one non-transitory computer-readable recording medium is encoded with at least one computer program including instructions that, when executed, operate to cause a mobile terminal communicative with a beverage-making apparatus to perform operations including: connecting the mobile terminal to the beverage-making apparatus; receiving, from the beverage-making apparatus, beverage-making state information indicating a state of the beverage-making apparatus; generating content based on the received beverage-making state information of the beverage-making apparatus; and displaying the generated content through a display unit of the mobile terminal.

In some implementations, the beverage-making state information indicates that the beverage-making apparatus is in one of a first state that is prior to the beverage-making process, a second state that is during the beverage-making process, or a third state that is after the beverage-making process.

In some implementations, generating the content based on the received beverage-making state information of the beverage-making apparatus includes: based on the beverage-making state information indicating that the beverage-making apparatus is in the first state prior to the beverage-making process, generating the first content for guiding the beverage-making process, based on information that is stored in the mobile terminal or that is received from at least computer communicative with the mobile terminal.

In some implementations, based on the beverage-making state information indicating that the beverage-making apparatus is in the second state that is during the beverage-making process, the beverage-making state information further includes at least one of information regarding a type or an ingredient of the beverage being made, or information regarding a beverage-making progress degree of the beverage-making apparatus, and wherein generating the content based on the received beverage-making state information of the beverage-making apparatus includes: generating the content depending on the type of the beverage being made in the beverage-making process and depending on at least one of the ingredient of the beverage being made or the beverage-making progress degree of the beverage-making apparatus indicated in the beverage-making state information.

In another aspect, a mobile terminal includes: a wireless communication unit configured to communicate with a beverage-making apparatus; a display unit; and at least one processor. The at least one processor is configured to: receive, through the wireless communication unit, beverage-making state information indicating a state of the beverage-making apparatus; generate content based on the received beverage-making state information of the beverage-making apparatus; and output the generated content through the display unit. The beverage-making state information indicates one of a first state in which the beverage-making apparatus is currently performing a beverage-making process, or a second state in which the beverage-making apparatus is not currently performing the beverage-making process. The at least one processor is further configured to, based on the beverage-making state information indicating the first state in which the beverage-making apparatus is currently performing the beverage-making process: generate the content based on information received from the beverage-making apparatus regarding the beverage-making process being performed.

In some implementations, the information received from the beverage-making apparatus regarding the beverage-making process includes information regarding a type or an ingredient of the beverage being made, and the at least one processor is configured to generate the content according to the type or the ingredient of the beverage being made that is indicated in the information received from the beverage-making apparatus.

In some implementations, the at least one processor is configured to generate the content according to the type or the ingredient of the beverage being made by: generating first content that includes information regarding a food that is matched to the type or the ingredient of the beverage being made.

In some implementations, the information received from the beverage-making apparatus regarding the beverage-making process includes information regarding a beverage-making progress degree of the beverage-making apparatus, and the at least one processor is configured to generate the content by generating second content that indicates the beverage-making progress degree of the beverage-making apparatus.

In some implementations, the at least one processor is configured to, based on the beverage-making state information indicating that the beverage-making process has been completed by the beverage-making apparatus: transmit, to one or more computers that are communicative with the mobile terminal, information regarding the beverage-making process that is generated after the beverage-making process is completed.

In some implementations, the at least one processor is configured to, based on the beverage-making state information indicating the second state in which the beverage-making apparatus is not currently performing the beverage-making process: generate the content based on information that is stored in the mobile terminal or that is received from one or more computers that are communicative with the mobile terminal.

In some implementations, the generated content includes a first content for guiding the beverage-making process or a second content related to a user review of a beverage made by the beverage-making process.

Further scope of applicability of the present disclosure will become apparent from the detailed description given hereinafter. However, it should be understood that the detailed description and specific examples are given by of illustration only, and that various changes and modifications within the spirit and scope of the disclosure may be made.

BRIEF DESCRIPTION OF THE DRAWINGS

FIG. 7 is a flowchart illustrating an example of operating the mobile terminal according to an implementation;

FIGS. 8A and 8B are flowcharts illustrating examples of a mobile terminal generating content based on an operation state of the beverage-making apparatus, according to implementations;

DETAILED DESCRIPTION

Implementations described herein provide a mobile terminal configured to provide various types of information based on an operation state of a beverage-making apparatus. In some implementations, the mobile terminal is configured to guide one or more operations of beverage-making using the beverage-making apparatus, based on information regarding scheduling or events of a user. As such, implementations may increase the utility and convenience of using a beverage-making apparatus.

In some scenarios, the mobile terminal may help improve satisfaction of a user with respect to a beverage-making apparatus by providing useful information related to a beverage being made through the beverage-making apparatus.

As such, even if a user lacks knowledge about making beverages using a beverage-making apparatus, implementations disclosed herein can effectively provide the user with useful information related to beverages made using the beverage-making apparatus.

According to some implementations of the present disclosure, the mobile terminal generates various types of content, based on an operation state of the beverage-making apparatus, so that content suitable for the operation state of the beverage-maker can be provided to a user.

Particularly, in some implementations, before beginning a beverage-making process of the beverage-making apparatus, the mobile terminal provides content for guiding the user to perform the beverage-making process, so that the user can conveniently determine a beverage-making time or make a desired beverage, based on the provided content.

In some implementations, during a beverage-making process of the beverage-making apparatus, the mobile terminal may provide various useful information related to the beverage being made, such as a state of the beverage-making process and information related to food matched to the beverage being made. Accordingly, the utility of the beverage-making apparatus can be improved, and satisfaction of the user can also be improved.

One example of a beverage-making apparatus is a beer-maker, which may be used in homes. Typically, house beer may include a total of three steps, i.e., a wort producing step, a fermenting step, and a ripening step, and two weeks to three weeks may be required from the wort producing step to the ripening step. In some scenarios, a beverage-making apparatus can be configured to conveniently regulate a temperature for beer fermentation.

Hereinafter, exemplary implementations of the present disclosure will be described in detail with reference to the accompanying drawings.

Some of the examples below describe a scenario in which the beverage-making apparatus is specifically a beer-making apparatus. However, implementations are not limited thereto, and may be implemented as any suitable beverage making apparatus that utilizes fermentation.

Figure 1:
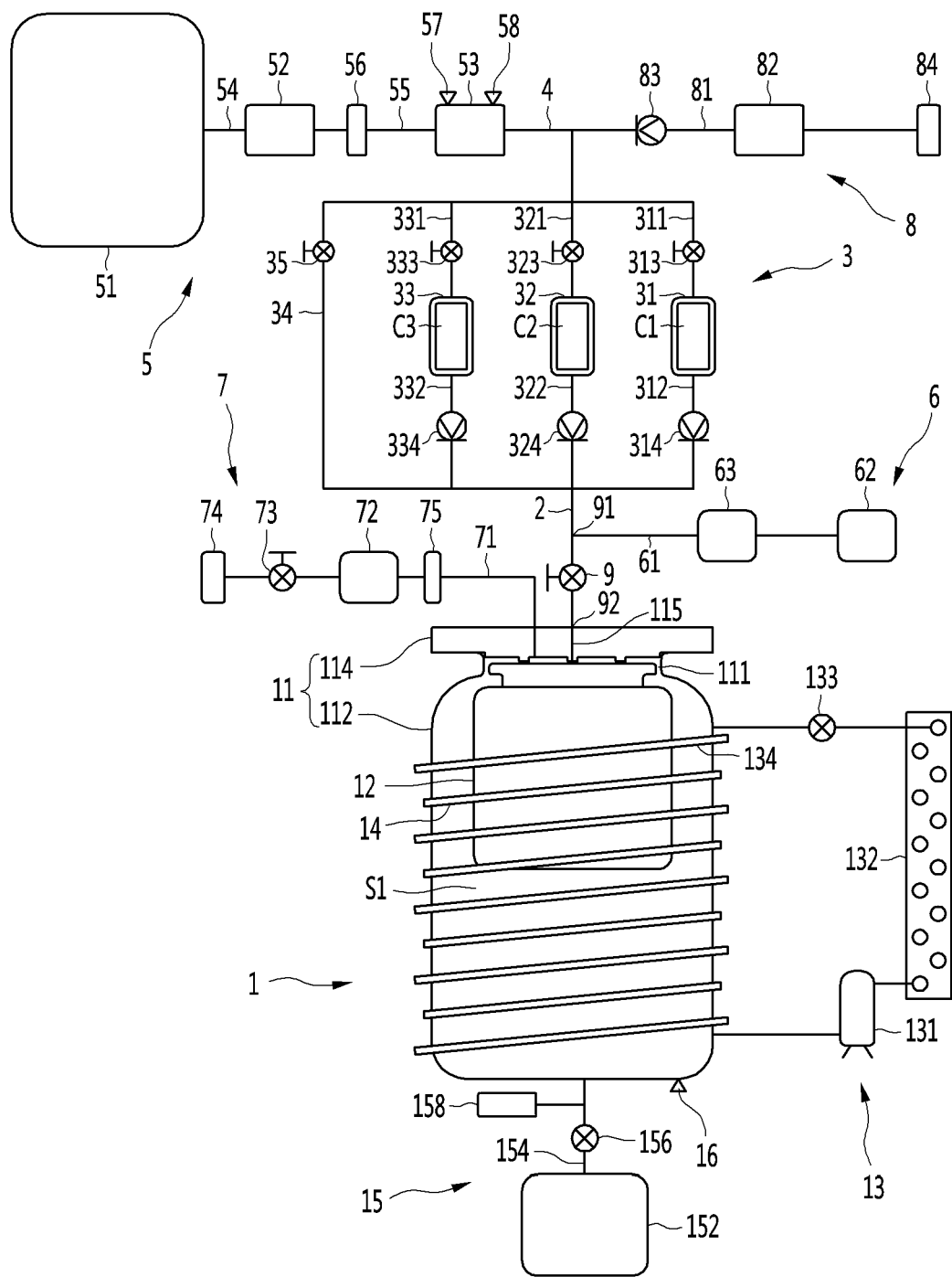
FIG. 1 is a diagram illustrating an example of an entire configuration view of a beverage-making apparatus according to some implementations.

FIG. 1 is an entire configuration view of a beverage maker according to an implementation.

The beverage making apparatus, as shown in FIG. 1, may include a fermentation module 1, an ingredient supplier 3 (or simply, supplier 3) connected to the fermentation module 1 through a main channel 2 (also referred to as main flow path 2), a water supply module 5 connected to the supplier 3 through a water supply channel 4 (also referred to as water supply flow path 4), and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which ingredients for brewing a beverage are accommodated. The following description will focus on the scenario of a beverage brewing pack 12 as the beverage ingredient pack, although implementations may be applied to any suitable beverage ingredient pack utilized for fermentation.

The beverage brewing pack 12 may be formed smaller than the space S1 formed in the fermentation tank assembly 11. The beverage brewing pack 12 may be inserted and accommodated in the fermentation tank assembly 11 in a state in which the ingredients are accommodated therein. The beverage brewing pack may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the ingredients to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, in the case where the beverage is beer, the ingredients for brewing the beer may include water, malt, yeast, hops, flavor additives, and the like.

The beverage maker may include both of the supplier 3 and the beverage ingredient pack 12, and the ingredients for brewing the beverage may be distributed and accommodated in the supplier 3 and the beverage ingredient pack 12. Some ingredients among the ingredients for brewing the beverage may be accommodated in the beverage ingredient pack 12, and the other ingredients may be accommodated in the supplier 3. The other ingredients accommodated in the supplier 3 may be supplied to the beverage ingredient pack 12 together with water supplied from the water supply module 5, and be mixed with the ingredients accommodated in the beverage ingredient pack 12.

A main ingredient essential to brew the beverage may be accommodated in the beverage ingredient pack 12, and additives added to the main ingredient may be accommodated in the supplier 3. In this case, the additives accommodated in the supplier 3 may be mixed with the water supplied from the water supply module 5 to be supplied to the beverage ingredient pack 12, and be mixed with the main ingredient accommodated in the beverage ingredient pack 12.

The main ingredient accommodated in the beverage ingredient pack 12 is an ingredient having a larger volume than the other ingredients, and may be, in the case of beer, the malt among the malt, the yeast, the hops, and the flavor additives. In addition, the additives accommodated in the supplier 3 may be the other ingredients except the malt among the ingredient for brewing the beer, and be the yeast, the hops, the flavor additives, and the like.

In some implementations, the beverage maker does not include both of the beverage ingredient pack 12 and the supplier 3 as described above, but may include only the supplier 3 without any separate beverage ingredient pack 12. All of the ingredients for brewing the beverage may be accommodated in the supplier 3. In this case, all of the ingredients accommodated in the supplier 3 may be supplied to the inside of the fermentation tank assembly 11 together with the water supplied from the water supply module 5. The main ingredient and the additives may be accommodated together in the supplier 3. The main ingredient and additives, which are accommodated in the supplier 3, may be simultaneously supplied to the inside of the fermentation tank assembly 11 or be sequentially supplied with a time difference.

In addition, the beverage maker does not include any separate beverage ingredient pack 12, but may directly inject some ingredients among the ingredients for brewing the beverage into the fermentation tank assembly 11 and allow the other ingredients for brewing the beverage to be accommodated in the supplier 3. In this case, a user may directly inject the main ingredient into the fermentation tank assembly 11, and the additives may be accommodated in the supplier 3. The additives accommodated in the supplier 3 may be mixed with the water supplied from the water supply module 5, and be mixed with the main ingredient previously injected into the fermentation tank assembly 11.

In addition, the beverage maker does not include the supplier 3, but may include the beverage ingredient pack 12. In this case, the main ingredient may be accommodated in the beverage ingredient pack 12, and the user may directly inject the additives into the beverage ingredient pack 12.

In addition, the beverage maker does not include both of the supplier 3 and the beverage ingredient pack 12, but the user may directly inject the main ingredient and the additives simultaneously or with a time difference into the fermentation tank assembly 11.

When the beverage maker includes both of the supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the supplier 3 and the beverage ingredient pack 12.

The ingredients injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the supplier 3 will be described as follows.

The supplier 3 may be connected to a water supply heater 53 through the water supply flow path 4, and be connected to the fermentation tank assembly 11 through the main flow path 2.

The supplier 3 may accommodate ingredients required to brew the beverage therein, and be configured to allow water supplied from the water supply module 5 to pass therethrough. For example, in the case of beer, the ingredients accommodated in the supplier 3 may be yeast, hops, flavor additives, and the like.

The ingredients accommodated in the supplier 3 may be directly accommodated in an ingredient accommodation part formed in the supplier 3. At least one ingredient accommodation part may be formed in the supplier 3. A plurality of ingredient accommodation parts may be formed in the supplier 3. In this case, the plurality of ingredient accommodation parts may be formed to be divided from one another.

In some implementations, the ingredients accommodated in the supplier 3 may be accommodated in a capsule, and at least one capsule accommodation part in which the capsule is accommodated may be formed in the supplier 3. When the ingredients are accommodated in the capsule, the supplier 3 may be configured such that the capsule is mountable and extractable. The supplier 3 may be configured as a capsule kit assembly in which the capsule is separably accommodated.

Each of the main flow path 2 and the water supply flow path 4 may be connected to the supplier 3. The water supplied through the water supply flow path 4 may be mixed with the ingredients by passing through the ingredient accommodation part or the capsule. The ingredients accommodated in the ingredient accommodation part or the capsule may flow in the main flow path 2 together with the water.

A plurality of different kinds of additives may be separated from one another to be accommodated in the supplier 3. The plurality of additives accommodated in the supplier 3 may be yeast, hops, and flavor additives, and be separated from one another to be accommodated in the supplier 3.

When a plurality of ingredient accommodation parts are formed in the supplier 3, each of the plurality of ingredient accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The ingredient accommodation part of the supplier 3 and the capsule accommodation part of the supplier 3 may be the substantially same component. When the capsule is inserted into the supplier 3 in a state in which the ingredients are accommodated in the capsule, the component may be referred to as the capsule accommodation part. When the ingredients are directly accommodated in the supplier 3 in a state in which the ingredients are not contained in the capsule, the component may be referred to as the ingredient accommodation part. Since the ingredient accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. The first additive may be yeast, the second additive may be hop, and the third additive may be a flavor additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part 31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the ingredients of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the ingredients of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the ingredients of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector 8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank 51 containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

In some implementations, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow malt and water to be uniformly mixed together by injecting air into the beverage ingredient pack 12. As such, in the case of beer making, bubbles generated from the liquid malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to the ingredients in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may be opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while ingredients are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
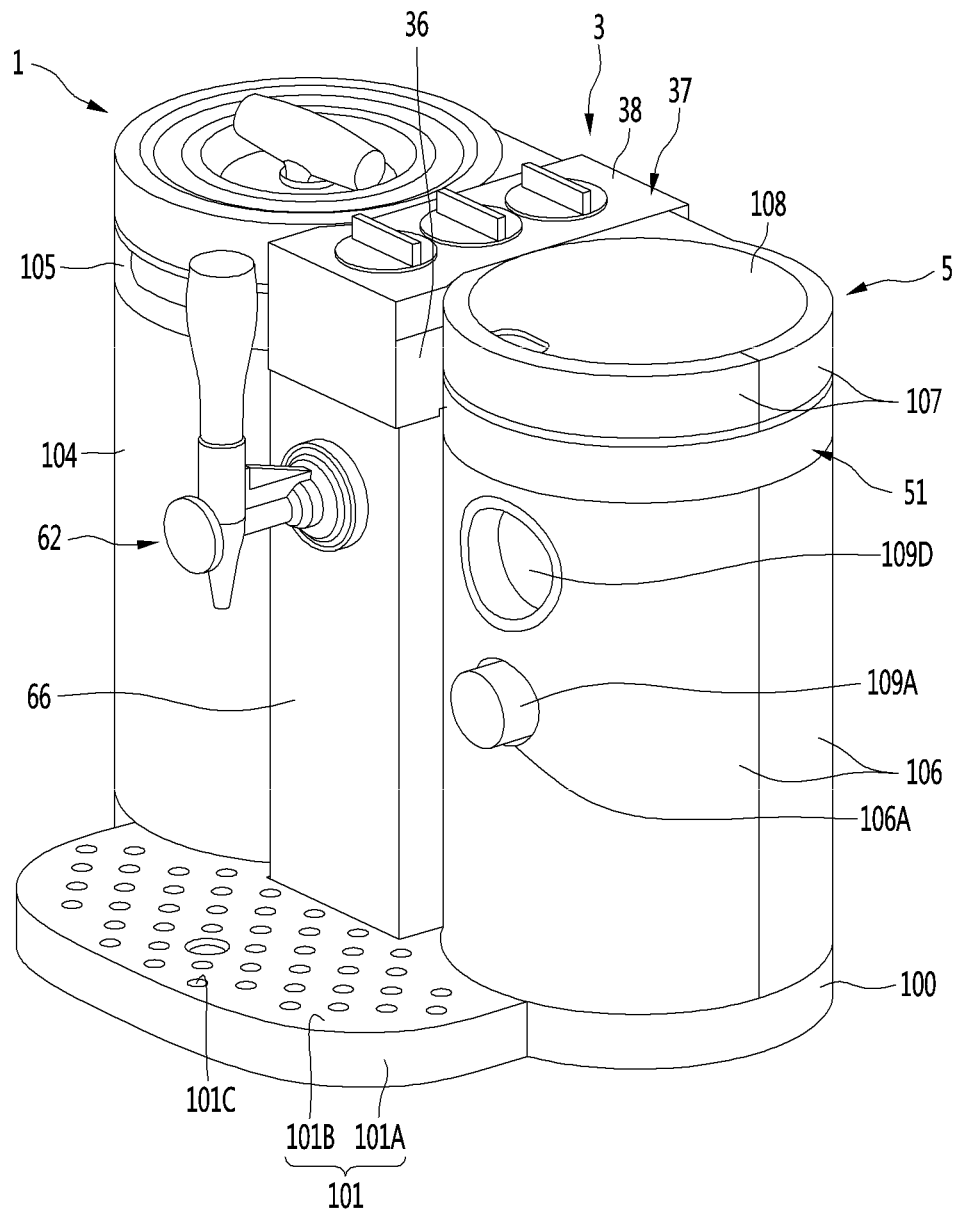
FIG. 2 is a diagram illustrating an example of a perspective view of the beverage-making apparatus according to some implementations.
Figure 3:
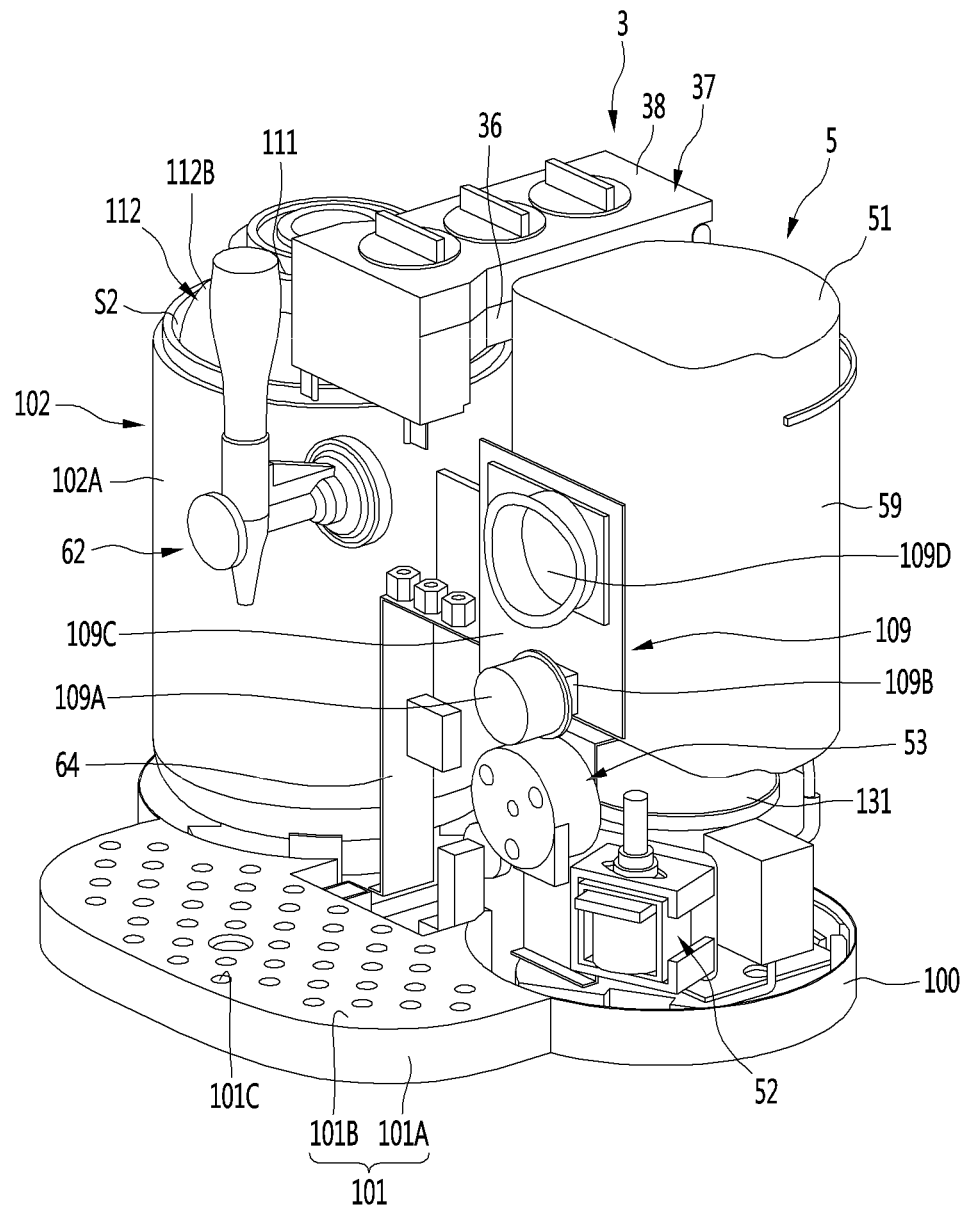
FIG. 3 is a diagram illustrating an example of a perspective view illustrating an inside of the beverage-making apparatus according to some implementations.
Figure 4:
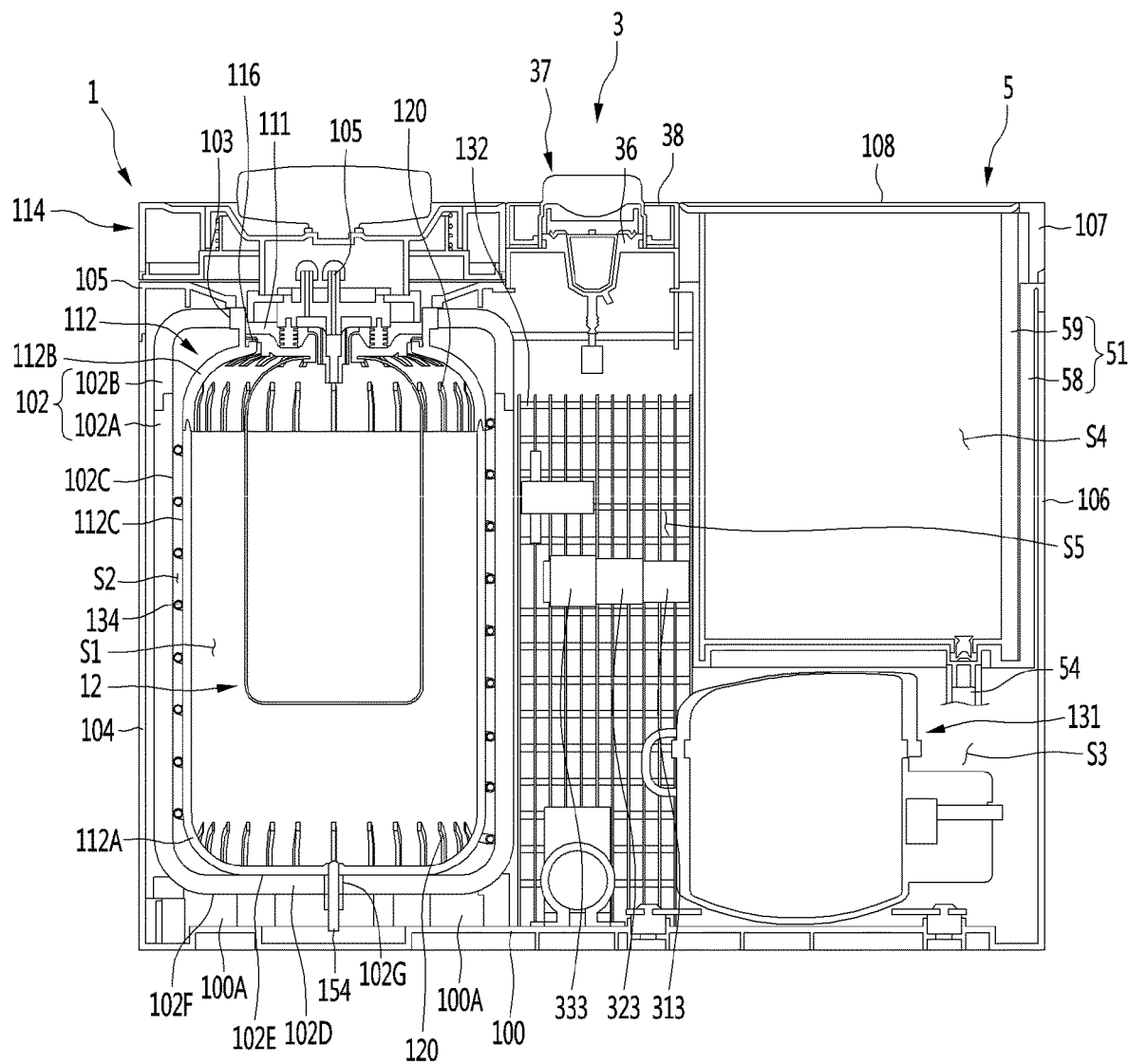
FIG. 4 is a diagram illustrating an example of a front view illustrating an inside of the beverage-making apparatus according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat part 116 on which the beverage ingredient pack 12 is mounted may be provided in the fermentation tank 112. The seat part 116 may be provided to protrude from the opening 111, and a circumferential part of the beverage ingredient pack 12 may be mounted on the seat part 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

In some implementations, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube extending to the outside of the heat insulating wall 102 by passing through an evaporating tube through-hole formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

In some implementations, the water tank 51 may be spaced apart from the base 100 at the top side of the base 100. The water tank 51 may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank 58 to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

In some implementations, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

In some implementations, the beverage extraction valve may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include a controller 109 that controls the beverage maker.

The controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may be any suitable mechanical and/or electronic input unit. For example, the input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. As another example, the input unit may include a touch screen that receives a command of the user in a touch-based manner. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information that has been input through the input unit.

The display 109D may display information of the beverage brewing pack 12 and information on a fermentation time of beverage ingredients, a beverage completion time, or the like. The fermentation time of the beverage ingredients or the beverage completion time may be changed depending on kinds of the beverage ingredients contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip in which various information related to the beverage ingredients may be attached in the shape of a sticker, etc. to the beverage brewing pack 12, and the chip and an NFC tag that transmits/receives data may be installed in the beverage maker. In such implementations, the NFC tag may be mounted on the fermentation tank assembly 11, the main PCB 109C, or the display PCB. When the NFC tag is mounted on the fermentation tank assembly 11, the NFC tag may be mounted on the opening 111 of the fermentation tank 112 or the fermentation tank cover 114. The NFC tag may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

In some implementations, when the NFC tag is installed on the display PCB, the NFC tag may be installed at a front portion of the beverage maker. If the beverage brewing pack 12 comes close to the front portion of the beverage maker by the user, the controller 109 may acquire information related to beverage-making ingredients from the beverage brewing pack 12.

The controller 109 may transmit the information acquired from the NFC tag to the display 109D or the wireless communication device, and the display 109D or the wireless communication device may display kinds of beverage ingredients, a total fermentation time, a beverage completion time, or the like.

In some implementations, the controller 109 may acquire information related to beverage-making ingredients from the wireless communication device through the wireless communication element. The wireless communication device may receive the information related to the beverage-making ingredients from the user, or acquire the information related to the beverage-making ingredients from the beverage brewing pack 12 using an NFC communication module. The wireless communication device may transmit the acquired information to the beverage-making apparatus.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time required to turn on the micro switch, a time required to drive the air pump 152, and a time required to turn on the main valve 9 after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
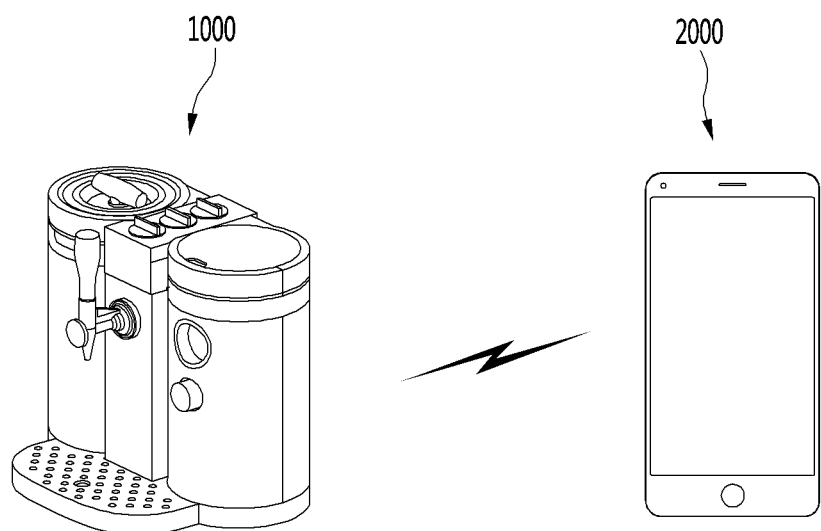
FIG. 5 is a diagram illustrating an example of a system including a beverage-making apparatus and a mobile terminal connected to the beverage-making apparatus according to some implementations.

FIG. 5 is a diagram illustrating an example of a system including a beverage-making apparatus and a mobile terminal connected to the beverage-making apparatus according to an implementation.

Referring to FIG. 5, the system may include a beverage-making apparatus 1000 and a mobile terminal 2000 connected to the beverage-making apparatus 1000. The beverage-making apparatus 1000 shown in FIG. 5 may correspond, for example, to the beverage-making apparatus described in FIGS. 1 to 4.

The beverage-making apparatus 1000 and the mobile terminal 2000 may be connected through wireless communications, for example through a wireless communication protocol. The wireless communication protocol may be, for example, Wi-Fi, Bluetooth, ZigBee, or any other suitable wireless communication protocol. As other examples, the mobile terminal 2000 may communicate with the beverage-making apparatus 1000 using short-range wireless communication signals, or may indirectly communicate via an intermediate device, such as a relay or a router.

The beverage-making apparatus 1000 may transmit various information related to the beverage-making apparatus 1000 to the mobile terminal 2000. The various information may include, for example, information related to an on/off state of the beverage-making apparatus 1000, information related to a type of the beverage-making apparatus 1000, information related to beverage ingredients acquired from the beverage brewing pack 12 and/or supplier 3 of apparatus 1000, beverage brewing information based on beverage ingredients of the apparatus 1000, and/or beverage maintenance or storage information related to the apparatus 1000.

The mobile terminal 2000 may store one or more programs, such as applications, that when executed by one or more processors, perform operations of providing brewing information regarding the beverage-making apparatus 1000. For example, if the stored application is executed, the mobile terminal 2000 may display information received from the beverage-making apparatus 1000, such as information regarding ingredients or recipes for making a beverage using apparatus 1000, or remotely control an operation of the beverage-making apparatus 1000 based on the displayed information.

The mobile terminal 2000 may include, for example, a cellular phone, a smart phone, a laptop computer, a terminal for digital broadcast, a personal digital assistant (PDA), a portable multimedia player (PMP), a navigation system, a tablet PC, an ultrabook, a wearable device (e.g., a smartwatch, a smart glass, or a head mounted display (HMD)), and the like. An example of a configuration of the mobile terminal 2000 will be described with reference to FIG. 6.

Figure 6:
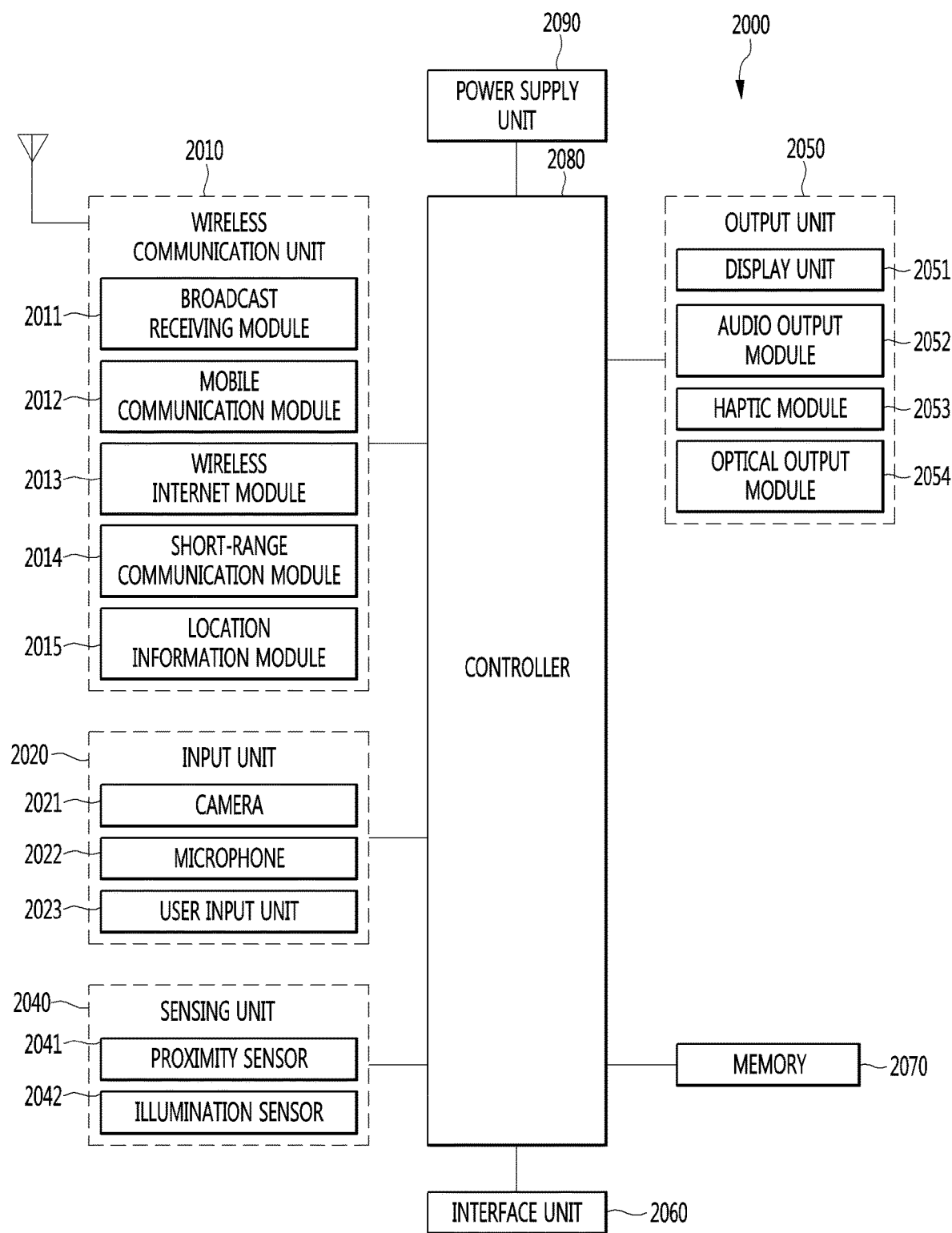
FIG. 6 is a block diagram illustrating an example of a mobile terminal according to some implementations.

FIG. 6 is a schematic block diagram of an example of a mobile terminal according to an implementation.

In this example, the mobile terminal 2000 is shown having components such as a wireless communication unit 2010, an input unit 2020, a sensing unit 2040, an output unit 2050, an interface unit 2060, a memory 2070, a controller 2080, and a power supply unit 2090. However, not all implementations of the present disclosure necessarily implement all of the illustrated components in FIG. 6, and greater or fewer components may alternatively be implemented.

Referring to FIG. 6, the mobile terminal 2000 is shown having wireless communication unit 2010. The wireless communication unit 2010 includes one or more components which enable wireless communication between the mobile terminal 2000 and other devices, such as the beverage-making apparatus 1000 or other devices on a wireless communication system or network with which the mobile terminal 2000 is communicative.

In this example, the wireless communication unit 2010 includes one or more modules which enable communications, e.g., wireless communications between the mobile terminal 2000 and a wireless communication system, communications between the mobile terminal 2000 and another device or mobile terminal, and/or communications between the mobile terminal 2000 and an external server. Further, the wireless communication unit 2010 includes one or more modules which connect the mobile terminal 2000 to other devices. To facilitate such communications, in the example of FIG. 6, the wireless communication unit 2010 includes one or more of a broadcast receiving module 2011, a mobile communication module 2012, a wireless Internet module 2013, a short-range communication module 2014, and a location information module 2015.

The mobile terminal 2000 in FIG. 6 also implements an input unit 2020, which includes a camera 2021 for obtaining images or video, a microphone 2022, which is one type of audio input device for inputting an audio signal, and a user input unit 2023 (for example, a touch key, a push key, a mechanical key, a soft key, and the like) for allowing a user to input information. Data (for example, audio, video, image, and the like) is obtained by the input unit 2020 and may be analyzed and processed by controller 2080 according to device parameters, user commands, and combinations thereof.

The mobile terminal 2000 also includes a sensing unit 2040 that is implemented with one or more sensors configured to sense internal information of the mobile terminal 2000, the surrounding environment of the mobile terminal 2000, user information, and the like. For example, in FIG. 6, the sensing unit 2040 is shown having a proximity sensor 2041 and an illumination sensor 2042.

In some implementations, the sensing unit 2040 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 2021), a microphone 2022, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), to name a few. The mobile terminal 2000 may be configured to utilize information obtained from sensing unit 2040, and in particular, information obtained from one or more sensors of the sensing unit 2040, and combinations thereof.

The mobile terminal 2000 also includes an output unit 2050 configured to output various types of information, such as audio, video, tactile output, and the like. In the example of FIG. 6, the output unit 2050 is shown having a display unit 2051, an audio output module 2052, a haptic module 2053, and an optical output module 2054.

The display unit 2051 may have an inter-layered structure or an integrated structure with a touch sensor in order to facilitate a touch screen. The touch screen may provide an output interface between the mobile terminal 2000 and a user, as well as providing a function as the user input unit 2023 which provides an input interface between the mobile terminal 2000 and the user.

The mobile terminal 2000 of FIG. 6 also implements an interface unit 2060, which serves as an interface with various types of external devices that can be coupled to the mobile terminal 2000. The interface unit 2060, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 2000 may perform assorted control functions associated with a connected external device, in response to the external device being connected to the interface unit 2060.

The mobile terminal 2000 also implements a memory 2070 that stores data to support various functions or features of the mobile terminal 2000. For instance, the memory 2070 may be configured to store application programs executed in the mobile terminal 2000, data or instructions for operations of the mobile terminal 2000, and the like. Some of these application programs may be downloaded from an external server via wireless communication. Other application programs may be installed within the mobile terminal 2000 at time of manufacturing or shipping, which is typically the case for basic functions of the mobile terminal 2000 (for example, receiving a call, placing a call, receiving a message, sending a message, and the like). It is common for application programs to be stored in the memory 2070, installed in the mobile terminal 2000, and executed by the controller 2080 to perform an operation (or function) for the mobile terminal 2000. Although the memory 2070 is shown in FIG. 6 as being a component that is separate and distinct from other components of FIG. 6, implementations are not limited thereto, and the memory 2070 may represent a collection of different memory elements that are implemented in different components of FIG. 6.

The mobile terminal 2000 also includes one or more processors, such as controller 2080, which functions to control overall operation of the mobile terminal 2000, in addition to the operations associated with the application programs. The controller 2080 may provide or process information or functions appropriate for a user by processing signals, data, information and the like, which are input or output by the various components depicted in FIG. 6, or activating application programs stored in the memory 2070.

As one example, the controller 2080 controls some or all of the components illustrated in FIGS. 1A-1C according to the execution of an application program that have been stored in the memory 2070. Although the controller 2080 is shown in FIG. 6 as being a component that is separate and distinct from other components of FIG. 6, implementations are not limited thereto, and the controller 2080 may represent a collection of different processors that are implemented in different components of FIG. 6.

The mobile terminal 2000 also includes a power supply unit 2090 that is configured to receive external power or provide internal power in order to supply appropriate power required for operating elements and components included in the mobile terminal 2000. In some implementations the power supply unit 2090 may include a battery, and the battery may be configured to be embedded in the terminal body, or configured to be detachable from the terminal body.

Various implementations described herein may be implemented in a computer-readable medium, a machine-readable medium, or similar medium using, for example, software, hardware, or any combination thereof.

The mobile terminal 2000 may perform operations, e.g., via an application, that controls operations of the beverage-making apparatus 1000 that is communicative to the mobile terminal 2000. The mobile terminal 2000 may also exchange various types of information with the beverage-making apparatus 1000 or various types of information related to a beverage that is produced by the beverage-making apparatus 1000. To perform such operations, the mobile terminal 2000 may execute an application downloaded from a computer, e.g., an external server, or may display interfaces that are generated by an application that is executed remotely by a computer.

For example, the controller 2080 of the mobile terminal 2000 may execute an installed application in response to an execution request of the application. As another example, the controller 2080 may perform operations in response to an application being executed remotely on a server. The controller 2080 may display various interfaces provided from the executed application through the display unit 2051. Examples of such operations and interfaces will be described further below.

FIG. 7 is a flowchart illustrating an example of operating a mobile terminal according to an implementation.

Referring to FIG. 7, the mobile terminal 2000 may perform operations according to an executed application, in response to an application execution command received through the user input unit 2023 or the like, and be connected to the beverage-making apparatus 1000, based on the executed application (S100). The application may be installed and executed on the mobile terminal 2000 or may be executed remotely and cause the mobile terminal 2000 to perform the resulting operations.

The application may correspond to an application that provides a function of remotely controlling one or more operations of the beverage-making apparatus 1000 using the mobile terminal 2000, or providing a user with various information related to a state of the beverage-making apparatus 1000, or providing various information related to other aspects of the beverage-making apparatus 1000.

If an execution command of the application installed in the mobile terminal 2000 is received, the controller 2080 of the mobile terminal 2000 may execute the application and be connected to the beverage-making apparatus 1000 through the application.

For example, the mobile terminal 2000 and the beverage-making apparatus 1000 may be connected via any suitable communication mechanism, e.g., wirelessly through Wi-Fi or Bluetooth, and the connection manner between the mobile terminal 2000 and the beverage-making apparatus 1000 is not limited to any particular communication technology or protocol.

The mobile terminal 2000 may receive beverage-making state information of the beverage-making apparatus 1000 (S110).

If the mobile terminal 2000 and the beverage-making apparatus 1000 are connected to each other, the controller 2080 of the mobile terminal 2000 may receive beverage-making state information from the beverage-making apparatus 1000. The controller 109 of the beverage-making apparatus 1000 may generate the beverage-making state information, based on an operation state of the beverage-making apparatus 1000, and transmit the generated beverage-making state information to the mobile terminal 2000.

The beverage-making state information may include information related to whether the beverage-making apparatus 1000 is currently performing a beverage-making operation. For example, the beverage-making state information may include any one state among a state prior to making of a beverage, a state during making of the beverage, or a state after making of the beverage.

In some implementations, the operation state of the beverage-making apparatus 1000 may be divided into a state in which the beverage is being made and a state in which the beverage is not being made. In this case, the state in which the beverage is not being made may include a state prior to making of the beverage and a state after making of the beverage. In addition, when the operation state is a state during making of the beverage, the mobile terminal 2000 may also receive, e.g., as part of the beverage-making state information, information regarding a type (or name, ingredient information, etc.) of the beverage being made, and information regarding a beverage-making state (e.g., a beverage-making progress degree, a beverage-making process, a temperature, a carbonic acid amount, etc.) of the beverage. As such, the beverage-making state information may include not only information regarding an operation state of the beverage-making apparatus 1000, but also other information regarding the beverage-making apparatus 1000.

The mobile terminal 2000 may provide various types of content to be provided to the user, based on the received beverage-making state information (S120). For example, the controller 2080 of the mobile terminal 2000 may generate different types of content, based on beverage-making state information received from the beverage-making apparatus 1000, such as operation states of the beverage-making apparatus 1000.

Step S120 will be described in more detail with reference to FIGS. 8A and 8B.

Figure 8B:
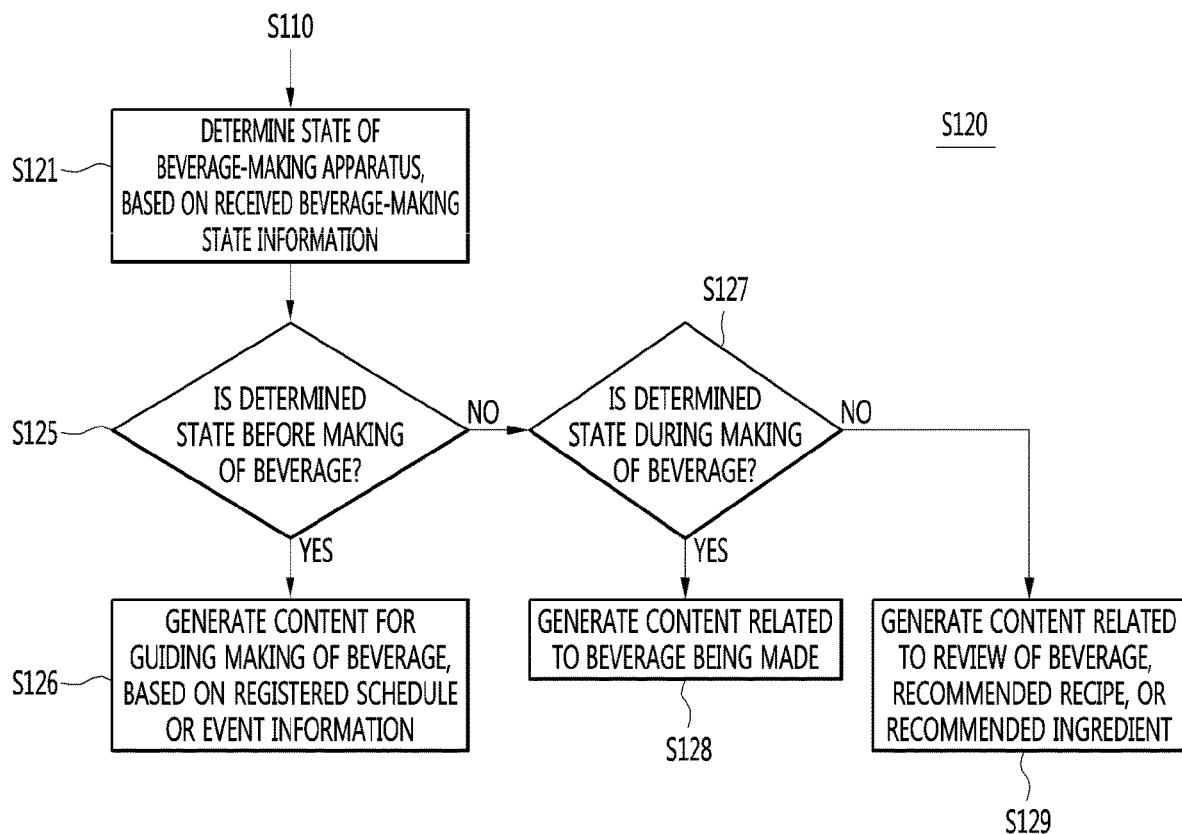

FIGS. 8A and 8B are flowcharts illustrating examples of operations in which the mobile terminal generates content, based on an operation state of the beverage-making apparatus, according to some implementations.

The example shown in FIG. 8A illustrates a scenario in which an operation state of the beverage-making apparatus 1000, which is included in beverage-making state information, is divided into a state in which the beverage is being made and a state in which the beverage is not being made.

Referring to FIG. 8A, the mobile terminal 2000 may determine an operation state of the beverage-making apparatus 1000, based on the beverage-making state information received from the beverage-making apparatus 1000 (S121).

When the determined operation state is the state in which the beverage is being made (YES of S122), the mobile terminal 2000 may generate different contents according to the type of beverage being made through the beverage-making apparatus 1000 (S123).

For example, the controller 2080 may receive information on a type of the beverage being made or ingredient information from the beverage-making apparatus 1000. The controller 2080 may generate content, based on the received information. For example, the controller 2080 may generate content including information regarding food that is matched to (e.g., harmonized with) the beverage being made, based on the type of the beverage being made.

On the other hand, when the determined operation state is the state in which the beverage is not being made (NO of S122), the mobile terminal 2000 may generate content, based on information stored in the mobile terminal 2000 or information received from a server connected to the mobile terminal 2000 (S124). In this case, the generated content may be various types of content, such as a content for guiding the beverage-making process of the beverage using the beverage-making apparatus 1000 or a content related to a user review of the beverage that is made, or a beverage-making history, etc. Examples of the content generated in step S124 may correspond to contents generated in steps S126 and S129 of 8B, respectively.

The example of FIG. 8B illustrates a scenario in which the operation state of the beverage-making apparatus, which is included in the beverage-making state information, is a state prior to making of the beverage, a state during making of the beverage, or a state after making of the beverage. For example, the state in which the beverage is not being made, which is described in FIG. 8A, may be a state prior to making of the beverage or a state after making of the beverage. In some implementations, the operation state may be categorized in more detail. In addition, when the operation state of the beverage-making apparatus 1000 is the state in which the beverage is being made, the beverage-making state information may further include information regarding a current beverage-making process (e.g., a primary fermenting process, a secondary fermenting process, a ripening process, etc.).

Referring to FIG. 8B, the mobile terminal 2000 may determine an operation state of the beverage-making apparatus 1000, based on the beverage-making state information received from the beverage-making apparatus 1000 (S121).

When the determined operation state is a state prior to making of the beverage (YES of S125), the mobile terminal 2000 may generate a first content for guiding the user to perform the making of the beverage, based on schedule information or event information registered to the user (S126).

For example, when the operation state of the beverage-making apparatus 1000 is a state prior to making of the beverage, the controller 2080 of the mobile terminal 2000 may acquire a schedule of the user, which is stored through a schedule application or the like of the mobile terminal 2000 or of a remote server. When a schedule (e.g., a party, sports game, etc.) of a specific category is found, the controller 2080 may generate a first content for guiding the user, for example to make a beverage prior to the date of the corresponding schedule using the beverage-making apparatus 1000, based on the acquired schedule of the user.

In some implementations, the controller 2080 may receive event information from a server or various web servers. The event information may correspond to a sports game, an anniversary, a holiday, a party, or the like. The controller 2080 may generate a first content for guiding the user to made a beverage prior to the date of the corresponding event using the beverage-making apparatus 1000, based on the received event information.

On the other hand, when the determined operation state is a state during making of the beverage (YES of S127), the mobile terminal 2000 may generate a second content related to the beverage currently being made (S128).

For example, when the operation state of the beverage-making apparatus 1000 is a state during making of the beverage, the mobile terminal 2000 may receive information on a type (or name, ingredient, etc.) of the beverage being made and beverage-making state information including a beverage-making state (e.g., a beverage-making progress degree, a beverage-making process, a temperature, a carbonic acid amount, etc.) of the beverage.

Information regarding the beverage may be determined by the beverage-making apparatus 1000 and conveyed to the mobile terminal 2000. For example, as described in FIG. 1, when the beverage ingredient pack 12 is accommodated in the fermentation tank assembly 11 of the beverage-making apparatus 1000, the controller 109 of the beverage-making apparatus 1000 may receive ingredient information from the beverage ingredient pack 12, e.g., through the communication module via wireless communications such as NFC, and acquire information regarding the type of the beverage being made based on the received ingredient information in the beverage ingredient pack 12. In addition, the controller 109 may determine a beverage-making progress degree of the beverage and a beverage-making process, based on a beverage making time, a temperature of the fermentation tank, a carbonic acid amount, and the like. The controller 109 may acquire temperature information through the temperature sensor 16, and calculated a carbonic acid amount, based on the acquired temperature and a pressure sensed by the pressure sensor 72.

The controller 2080 may generate a second content related to the beverage currently being made, based on the received beverage-making state information. For example, the generated second content may correspond to food matched to the beverage currently being made, a beverage-making progress degree of the beverage, a content for guiding the generation of a schedule on the basis of a beverage making completion data, or various contents related to the beverage currently being made.

When the determined operation state is a state after making of the beverage (NO of S127), the mobile terminal 2000 may generate a third content related to a user review of the beverage, a recommended recipe, or a recommended ingredient (S129). In an implementation, the mobile terminal 2000 may generate and provide a third content including a new ingredient package or promotion information in purchase of ingredients so as to guide the user to purchase ingredients for the beverage-making process. In an implementation, the mobile terminal 2000 may provide a third content related to a beverage-making history of the user and/or a recommended recipe on the basis of a review. In some implementations, various types of information (e.g., a user review, a recommended recipe, a recommended ingredient, promotion information, etc.) for generating the third content may be received from a remote server.

As such, according to implementations described above, the mobile terminal 2000 may generate different types of content according to beverage-making state information received from the beverage-making apparatus 1000, such as operation states of the beverage-making apparatus 1000, and provide the generated contents to the user.

Referring again to FIG. 7, the mobile terminal 2000 may output an interface including the generated content (S130).

Hereinafter, various implementations of the interface that is output by the mobile terminal 2000 will be described with reference to FIGS. 9A to 14.

Figure 9A:
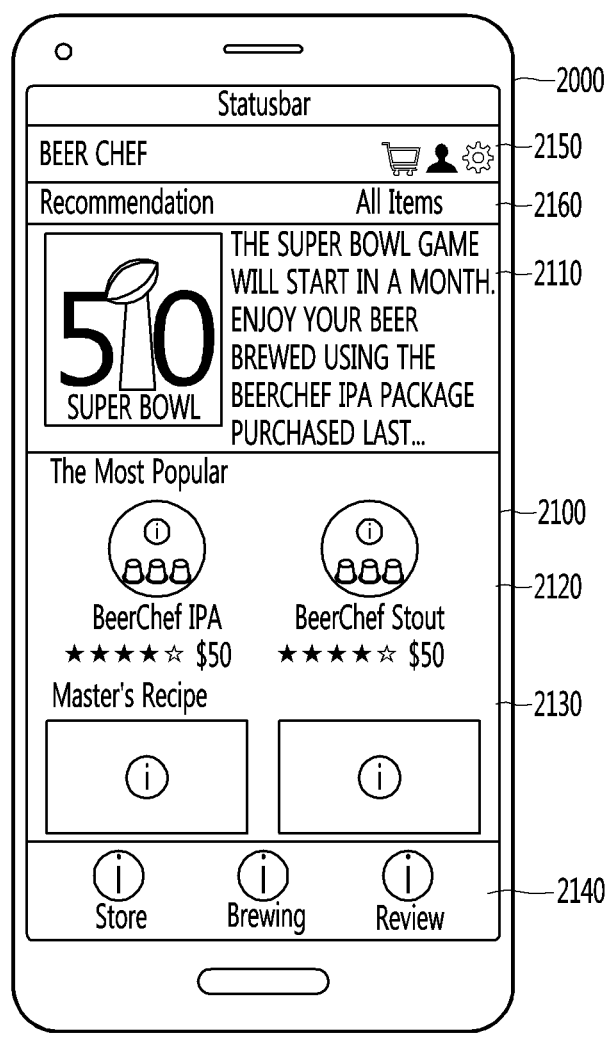
FIGS. 9A and 9B are diagrams illustrating examples of content provided by a mobile terminal when the operation state of the beverage-making apparatus is prior to a beverage-making process.
Figure 9B:
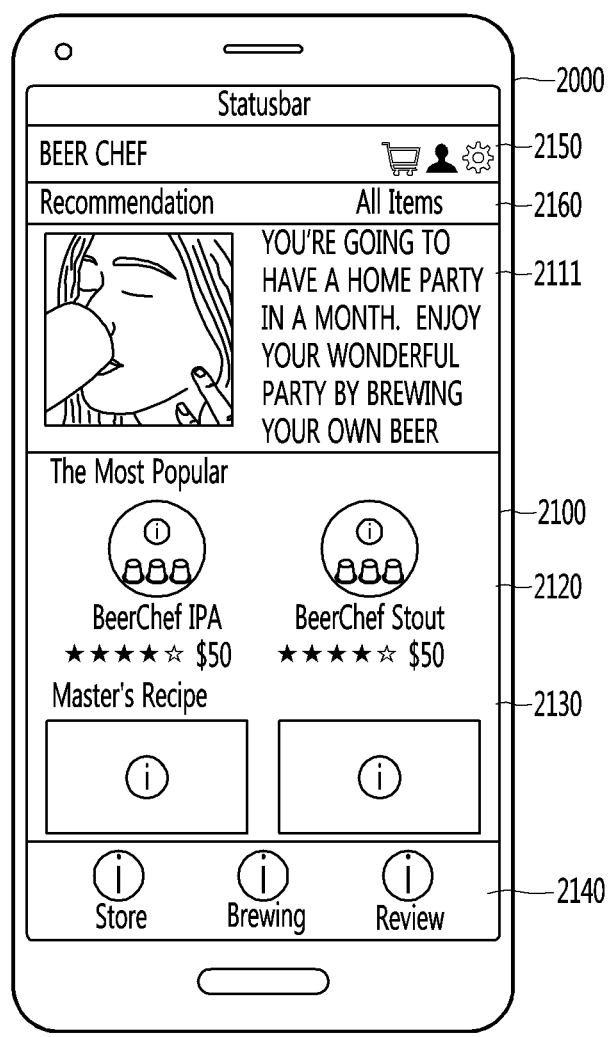

FIGS. 9A and 9B are diagrams illustrating examples of first content provided by a mobile terminal when the operation state of the beverage-making apparatus is a state prior to making the beverage.

Figure 10A:
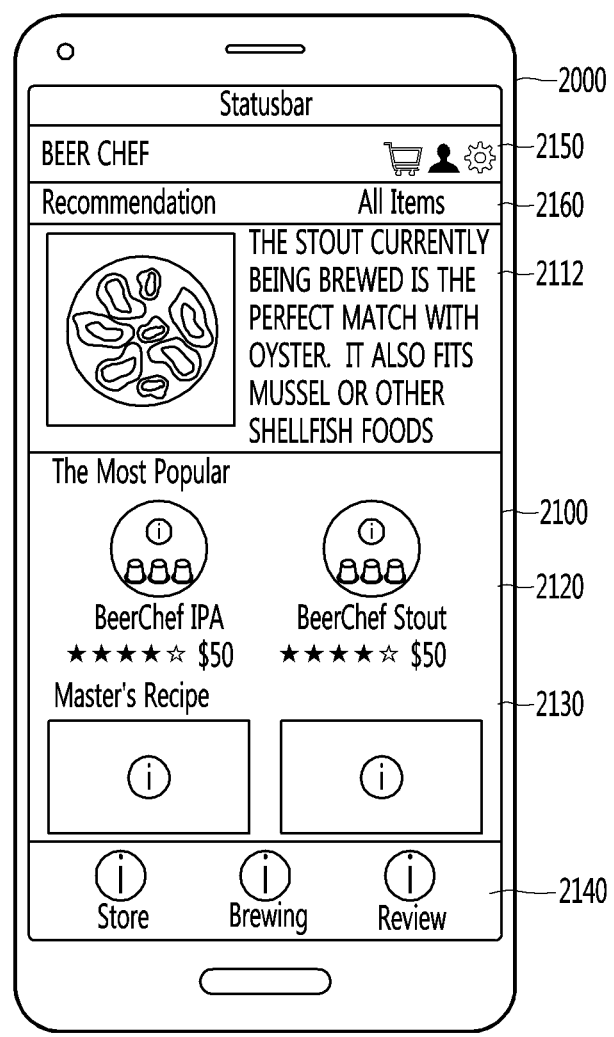
FIGS. 10A and 10B are diagrams illustrating examples of content provided by a mobile terminal when the operation state of the beverage-making apparatus is during a beverage-making process.
Figure 10B:
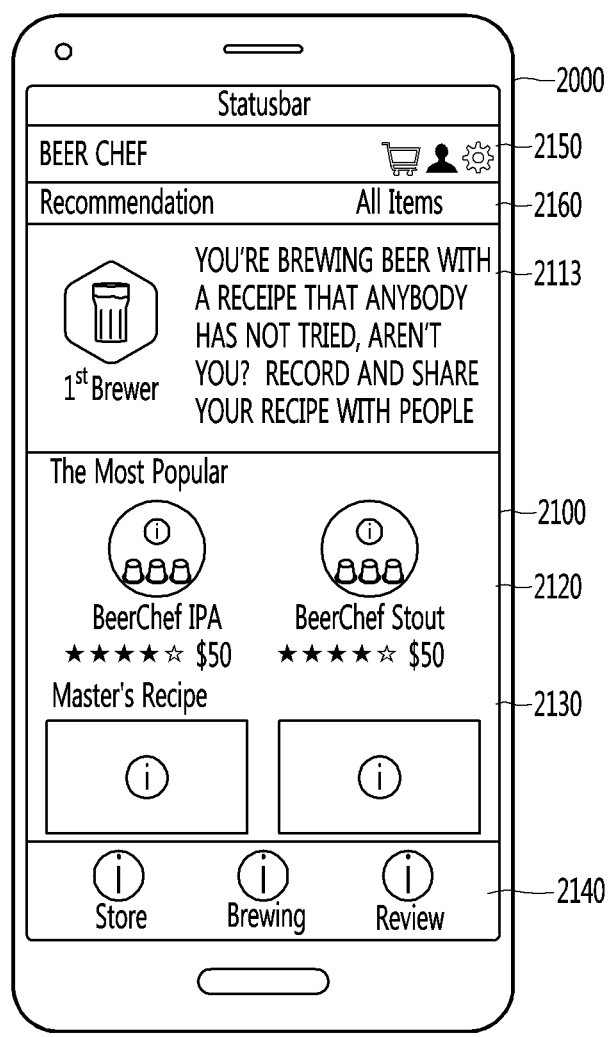

FIGS. 10A and 10B are diagrams illustrating examples of second content provided by the mobile terminal when the operation state of the beverage-making apparatus is a state during making of the beverage.

Figure 11:
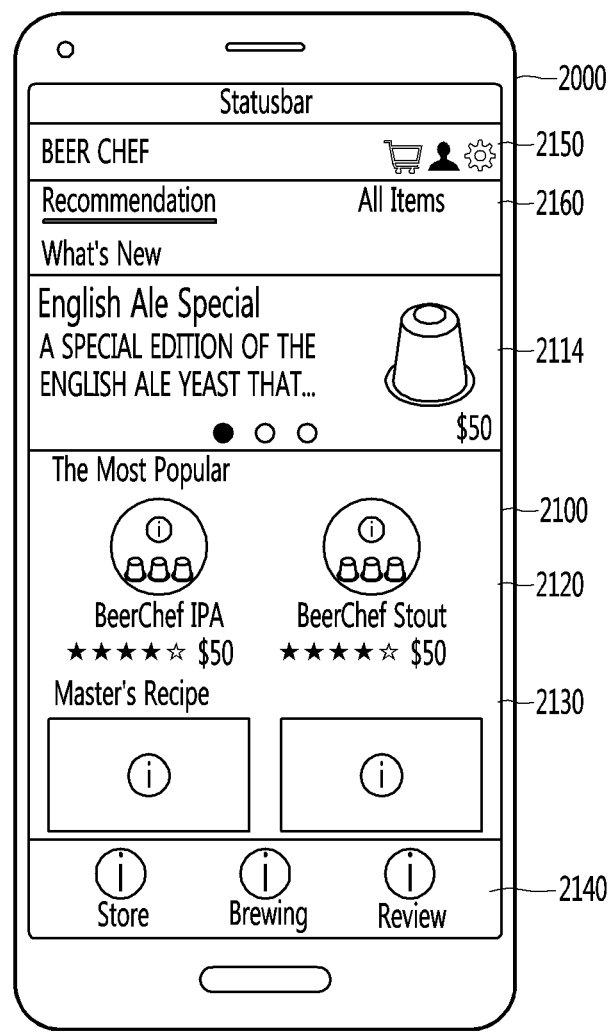
FIG. 11 is a diagram illustrating an example of content provided by a mobile terminal when the operation state of the beverage-making apparatus is after a beverage-making process.

FIG. 11 is a diagram illustrating an example of third content provided by the mobile terminal when the operation state of the beverage-making apparatus is a state after making of the beverage.

The examples shown in FIGS. 9A to 11 illustrate scenarios in which content provided by the mobile terminal 2000 is displayed on an interface for purchasing recipes or ingredients for a beverage. However, implementations are not limited thereto, and the content of FIGS. 9A to 11 may be displayed on a separate interface other than an interface for purchasing items.

Referring to FIG. 9A to 11, the controller 2080 may perform various operations according to an application that is executed on the mobile terminal 2000 or on a remote server. For example, the controller 2080 may display, e.g., through the display unit 2051, an interface 2100 among a plurality of interfaces provided by the application.

The interface 2100 may include various contents (e.g., 2110 to 2114 of FIGS. 9A to 11) that are provided based on, for example, the beverage-making state information received from the beverage-making apparatus 1000, recommended ingredient information 2120, an expert recipe information 2130, icons 2140 for changing the interface, a setting icon 2150 of the application, and a menu 2160 for tab switching in the interface.

The recommended ingredient information 2120 may provide information on recommended ingredients or recommended recipes based on, for example, purchasing orders, satisfaction degrees, grades, etc. of users. When a request for selecting any one of the recommended ingredients included in the recommended ingredient information 2120 is received, the controller 2080 may provide detailed information, a purchasing function and the like, which are related to the selected recommended ingredient.

The expert recipe information 2130 may provide information on recipes of experts with respect to beverage brewing. Similarly to the recommended ingredient information 2120, when a request for selecting any one of the recipes included in the expert recipe information 2130 is received, the controller 2080 may provide detailed information, a purchasing function, and the like, which are related to the selected recipe.

The icons 2140 are used to provide functions provided by the application of the present disclosure, respectively. For example, the icons 2140 may include a store icon, a beverage-making icon (e.g., brewing icon), and a review icon.

When the store icon is selected, the controller 2080 may display the interface 2100 that provides a purchasing function of ingredients for beverage brewing, and the like. When the beverage-making (e.g., brewing) icon is selected, the controller 2080 may display a beverage-making interface that provides information related to a state of the beverage-making apparatus 1000 or a state of the beverage being made. In addition, when the review icon is selected, the controller 2080 may display a review interface that provides a function of registering reviews of the beverage, a function of reading reviews registered by users, and the like.

The menu 2160 included in the interface 2100 may be used to provide a purchasing function of ingredients for making a beverage in various manners. For example, the menu 2160 may include a recommendation tab of FIG. 9A and an all items tab of FIG. 9A. When the recommendation tab is selected, the controller 2080 may display an interface that provides information on recommended ingredients based on purchasing orders, grades, etc. of users or recipes registered by experts. The interface 2100 shown in FIG. 9A may be an interface provided when the recommendation tab is selected.

In the example of FIG. 9A, when the "All Items" tab is selected, the controller 2080 may display an interface including a list of ingredients currently being sold. The user may directly select and purchase ingredients to be purchased, based on the list included in the displayed interface.

Referring to FIGS. 9A to 11, the interface 2100 may include first contents 2110/2111 of FIGS. 9A/9B, or second contents 2112/2113 of FIGS. 10A/10B, or third contents 2114 of FIG. 11. The contents 2110 to 2114, analogous to what was described in FIGS. 7 and 8, may be contents generated based on beverage-making state information received from the beverage-making apparatus 1000.

The controller 2080 may determine an operation state of the beverage-making apparatus 1000, based on the beverage-making state information. When the determined operation state is a state prior to making the beverage, the controller 2080 may generate a first content for guiding the user to perform the beverage-making process. The first content may be generated based on a schedule of the user or various event information.

FIGS. 9A and 9B illustrate two possible examples of first content that is displayed when the beverage-making apparatus 1000 is in an operation state prior to making the beverage.

Referring to FIG. 9A, the controller 2080 may generate a first content 2110, based on an upcoming sports event schedule that is acquired e.g., from a schedule application of the user or from a remote server. When the first content 2110 is generated, the controller 2080 may generate the first content 2110 using a date of the sports game schedule, and a beverage ingredient purchase history of the user. That is, the controller 2080 may display the first content 2110, to guide the user to perform the beverage-making process suitable for the date of the sports game schedule using purchased ingredients.

If the controller 2080 receives a request for selecting the first content 2110, then the controller 2080 may display detailed information on a schedule corresponding to the first content 2110, provide information related to making a beverage related to the first content 2110, or provide a purchasing function of a beverage recipe package related to the first content 2110.

FIG. 9B illustrates another example of first content that is displayed when the beverage-making apparatus 1000 is in an operation state prior to making the beverage.

Referring to FIG. 9B, the controller 2080 may generate a first content 2111, e.g., based on a home party schedule acquired from the schedule application of the user. The controller 2080 may display the generated first content 2111, to guide the user to perform a beverage-making process that is suitable for the home party schedule. In some implementations, when a request for selecting the first content 2111 is received, the controller 2080 may display detailed information on the home party schedule corresponding to the first content 2111.

FIGS. 10A and 10B illustrate two possible examples of second content that is displayed when the beverage-making apparatus 1000 is in an operation state during making of the beverage.

In relation to FIGS. 10A and 10B, the controller 2080 may determine an operation state of the beverage-making apparatus 1000, based on beverage-making state information received from the beverage-making apparatus 1000. When the determined operation state is a state that is during a beverage-making process, the controller 2080 may generate a second content including information related to beverage being made. The second content may include various types of information, e.g., regarding food matched to the beverage being made or information related to the beverage itself being made.

Referring to FIG. 10A, the beverage-making state information transmitted from the beverage-making apparatus 1000 to the mobile terminal 2000 may include information on a type (or name, ingredient, etc.) of beverage currently being made. The controller 2080 may acquire information on food matched to the beverage being made, based on the information on the type of the beverage, which is included in the received beverage-making state information. For example, the controller 2080 may transmit information regarding the type of the beverage currently being made to a remote server, and receive information on food matched to the type of the beverage from the server. In some implementations, the controller 2080 may also acquire information regarding the food that was matched to the type of the beverage, e.g., among information regarding a plurality of different foods stored in the memory 2070 of the mobile terminal 2000 or on a remote server. In this case, the food matched to the type of the beverage may include food harmonized with the beverage currently being made.

In the example of FIG. 10A, the controller 2080 may generate a second content 2112 including the acquired food information, and display the generated content 2112 through the display unit 2051. Through the displayed second content 2112, the user can conveniently acquire information on food matched to the beverage currently being made.

FIG. 10B illustrates another example of second content that is displayed when the beverage-making apparatus 1000 is in an operation state during making of the beverage.

Referring to FIG. 10B, the controller 2080 may provide information on a beverage currently being made, based on ingredient information of the beverage, which is included in the received beverage-making state information. For example, the controller 2080 may receive, e.g., from a remote server, information on reviews, evaluations, grades, etc. of users with respect to the beverage currently being made, and provide the received information. In some implementations, the user may arbitrarily combine ingredients (e.g., in the scenario of making beer, combining ingredients of wort, yeast, hops, and flavor additives) for the beverage-making process, and made the beverage using the beverage-making apparatus 1000. In this case, the type of beverage currently being made by the beverage-making apparatus may be a new type of beverage for the user. Therefore, a review or recipe of the beverage currently being made may not yet have been registered, e.g., saved to a server. Accordingly, the controller 2080 may generate the second content 2113 including a message for guiding the user to share a recipe (e.g., a combination of ingredients) of the beverage currently being made with other users. The controller 2080 may display the generated second content 2113 through the display unit 2051, to guide the user to register the recipe of the beverage currently being made.

In some implementations, when a request for selecting the displayed second content 2113 is received, the controller 2080 may display a recipe registration interface for registering the recipe of the beverage currently being made. The controller 2080 may register recipe information input based on the recipe registration interface, e.g., by saving the recipe information to a remote server.

FIG. 11 illustrates an example of third content that is displayed when the beverage-making apparatus 1000 is in an operation state that is after making of the beverage.

Referring to FIG. 11, the controller 2080 may determine an operation state of the beverage-making apparatus 1000, e.g., based on beverage-making state information received from the beverage-making apparatus 1000. When the determined operation state is a state after a beverage-making process has completed, then the controller 2080 may generate third content 2114 different from the above-described first and second contents.

The third content 2114 may include various types of content related to the completely-made beverage, such as content for registering reviews of the beverage made by the beverage-making apparatus 1000, content including a new ingredient, a recommended ingredient, discount information, or the like, which guide purchasing of beverage ingredients, content including a beverage-making history, or content including recommended recipes based on the beverage-making history.

The example of FIG. 11 illustrates third content 2114 including information on a new ingredient. When a request for selecting the displayed third content 2114 is received, the controller 2080 may provide detailed information on the new ingredient or a purchasing function of the new ingredient. That is, the controller 2080 may guide the user to purchase the new ingredient by providing the user with the information on the new ingredient after the beverage has been made using the beverage-making apparatus 1000.

Figure 12:
FIGS. 12 to 14 are diagrams illustrating other examples of content provided by a mobile terminal, based on the operation state of the beverage-making apparatus.
Figure 13:
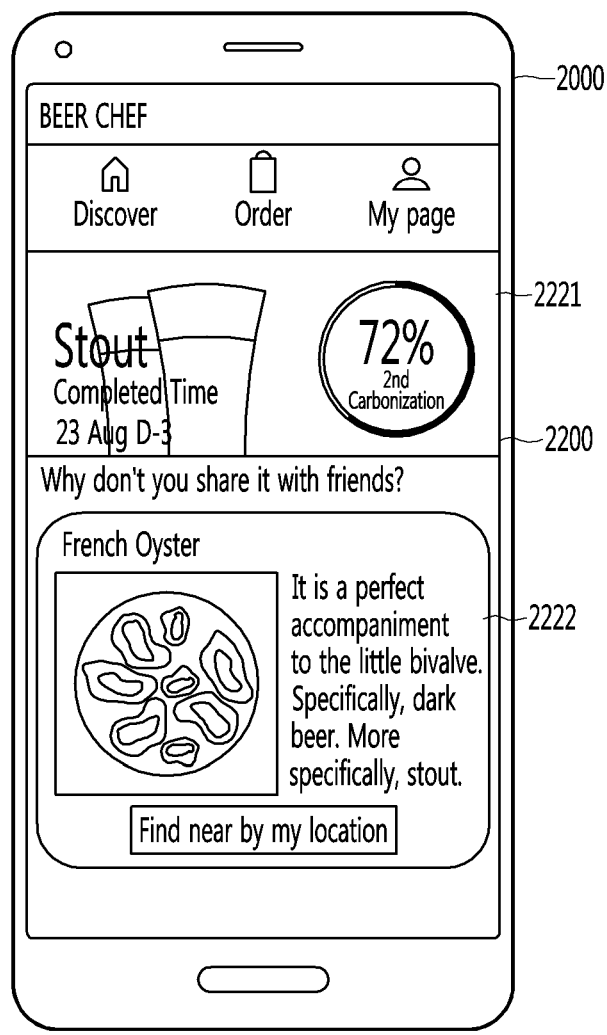
Figure 14:
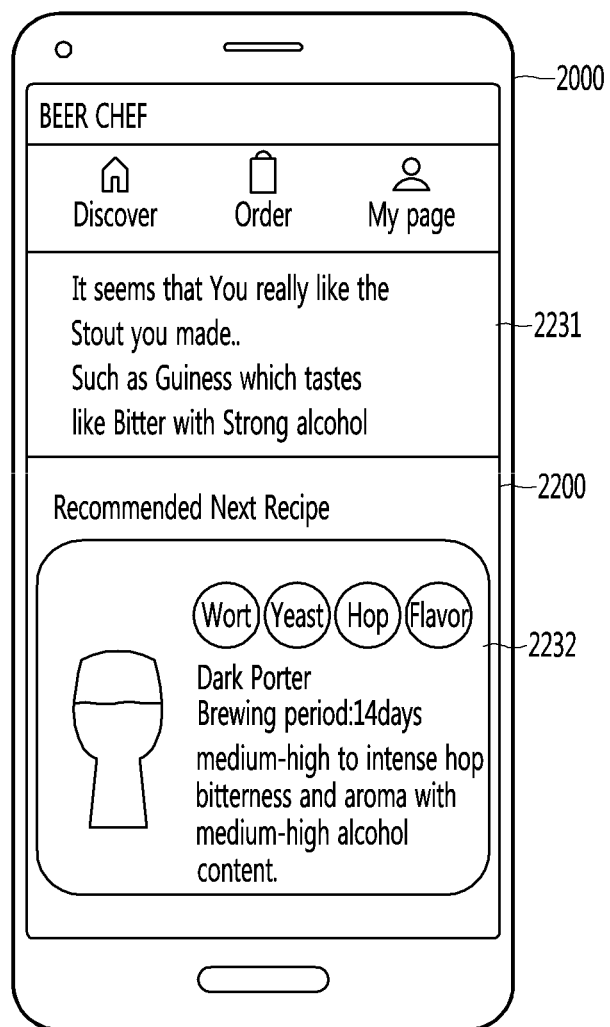

FIGS. 12 to 14 are diagrams illustrating examples of content interfaces provided by the mobile terminal 2000 that provide information regarding an operation state of the beverage-making apparatus 1000.

Unlike the examples of content shown in FIGS. 9A to 11 that displayed interfaces for purchasing recipes or ingredients for a beverage, FIGS. 12 to 14 illustrate examples in which the controller 2080 of the mobile terminal 2000 displays a separate interface (hereinafter, referred to as a 'content interface') configured with contents that are generated based on an operation state of the beverage-making apparatus 1000.

The controller 2080 may receive beverage-making state information from the beverage-making apparatus 1000, and determine an operation state of the beverage-making apparatus 1000, based on the received beverage-making state information. When the determined operation state is a state prior to making the beverage, the controller 2080 may display a content interface 2200 including a first content through the display unit 2051. Analogous to what was described in FIG. 8, the first content may correspond to a content for guiding the beverage-making process, based on a schedule of the user or various event information.

Referring to the implementation shown in FIG. 12, the controller 2080 may display, through the display unit 2051, a content interface 2200 including a content 2211 including information on a recent beverage-making date, a content 2212 including a message for guiding the user to perform beverage-making based on the date of a schedule or event, a content 2213 for event information, and a content 2214 for a recommended ingredient or recommended recipe related to the event.

Particularly, in relation to the content 2212, the controller 2080 may calculate a beverage-making start term of a beverage so as to complete beverage-making of the beverage before a schedule or event is started, based on the start date and current date of the schedule or event. The controller 2080 may provide a content 2212 including information on the calculated beverage-making start term. When the user starts the making of the beverage using the beverage-making apparatus 1000 before the beverage-making start term, the beverage-making apparatus 1000 may complete the beverage-making of the beverage before the schedule or event is started.

On the other hand, when the operation state of the beverage-making apparatus 1000 is a state during a beverage-making process, the controller 2080 may display a content interface 2200 including a second content through the display unit 2051. As described in FIG. 8, the second content may correspond to a beverage-making progress degree of beverage, food matched to the beverage being made, a content for guiding the generation of a schedule based on a beverage-making date, or various contents related to the beverage currently being made.

Referring to the implementation shown in FIG. 13, the controller 2080 may display, through the display unit 2051, a content interface 2200 including a content 2221 including a beverage-making progress degree of beverage being made by the beverage-making apparatus 1000 and a content 2222 for food matched to the beverage being made.

The content 2221 may include information on a type or name of the beverage currently being made and information on a beverage-making completion date, a current beverage-making process, and a beverage-making progress degree.

The content 2222, as described in FIG. 10A, may include food information received from the server or acquired from the memory 2070, based on the type of the beverage currently being made. The food information may be information on food matched to the beverage currently being made.

Based on the contents 2221 and 2222 included in the content interface 2200, the user can conveniently check a beverage-making progress state of the beverage currently being made by the beverage-making apparatus 1000, and acquire information on food matched to (harmonized with) the beverage being made.

When the operation state of the beverage-making apparatus 1000 is a state after completion of a beverage-making process, the controller 2080 may display a content interface 2200 including a third content through the display unit 2051. Analogous to what was described in FIG. 8, the third content may correspond to a content for providing a review registering function of the completed beverage, a content related to a beverage-making history of the user, a content including a recommended recipe based on the beverage-making history, or a content including new ingredient information or promotion information for guiding the user to purchase beverage ingredients.

Referring to the implementation shown in FIG. 14, the controller 2080 may display, through the display unit 2051, a content interface 2200 including a content 2231 on preference beverage information acquired from a beverage-making history of the user and a content 2232 of a recommended recipe based on the beverage-making history.

Based on the contents 2231 and 2232 included in the content interface 2200, the user can effectively acquire information on beverage to be made using the beverage-making apparatus 1000.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet).

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processes and operations described herein, such as those that generate and operate the user interfaces, may be executed entirely by a user's mobile terminal (e.g., mobile terminal 2000) executing an installed application, or may be executed entirely by a server system that remotely hosts the application, or may be executed by any combination of user-side and server-side processing.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a wireless communication transceiver configured to communicate with a beverage-making apparatus;
a display; and
at least one processor configured to:
receive, through the wireless communication transceiver, beverage-making state information indicating a state of the beverage-making apparatus,
acquire at least one of schedule information or event information registered to a user from at least one of a schedule application installed in the mobile terminal or a server connected to the mobile terminal,
extract an event corresponding to a predetermined event category from at least one of the schedule information or the event information,
calculate a beverage-making start deadline for completing making of a beverage by a date of the extracted event,
acquire a beverage ingredient purchase history of the user,
generate a first content including an instruction to make the beverage by the date of the extracted event using the beverage-making apparatus and using purchased ingredients based on the beverage ingredient purchase history, and
display, through the display, the first content in consideration of the beverage-making state information,
wherein the first content includes information regarding the calculated beverage-making start deadline.

2. The mobile terminal of claim 1, further comprising an input unit that includes at least one of a touch screen or a switch and that is configured to receive an input of the user,
wherein the at least one processor is configured to:
receive an input of selecting the first content, and
display, through the display, at least one of detailed information on the extracted event, information related to making the beverage related to the first content, or a purchasing content for purchasing of a beverage recipe package related to the first content, in response to the input of selecting the first content.

3. The mobile terminal of claim 1, wherein the beverage-making state information comprises information related to whether the beverage-making apparatus is currently performing the beverage-making process.

4. The mobile terminal of claim 3, wherein the beverage-making state information indicates that the beverage-making apparatus is in one of the first state that is prior to the beverage-making process, a second state that is during the beverage-making process, or a third state that is after the beverage-making process.

5. The mobile terminal of claim 4, wherein the at least one processor is configured to display, through the display, the first content based on the beverage-making state information indicating that the beverage-making apparatus is in the first state that is prior to the beverage-making process.

6. The mobile terminal of claim 4, wherein, based on the beverage-making state information indicating that the beverage-making apparatus is in the second state that is during the beverage-making process, the beverage-making state information further comprises at least one of information regarding a type or an ingredient of the beverage being made, or information regarding a beverage-making progress degree of the beverage, and
wherein the at least one processor is configured to, based on the beverage-making state information indicating that the beverage-making apparatus is in the second state that is during the beverage-making process:
generate a second content depending on the type of the beverage being made in the beverage-making process and depending on at least one of the ingredient of the beverage being made or the beverage-making progress degree of the beverage indicated in the beverage-making state information; and
display, through the display, the second generated content.

7. The mobile terminal of claim 6, wherein the at least one processor is configured to, based on the beverage-making state information indicating that the beverage-making apparatus is in the second state that is during the beverage-making process:
generate the second content comprising information regarding food that is matched to the beverage being made or information regarding the beverage-making progress degree; and
display, through the display, the second content.

8. The mobile terminal of claim 6, wherein the at least one processor is configured to, based on the beverage-making state information indicating that the beverage-making apparatus is in the third state that is after the beverage-making process:
transmit, to at least one computer connected to the mobile terminal, information regarding the beverage-making process that is generated after the beverage-making process has completed.

9. The mobile terminal of claim 4, wherein the least one processor is configured to, based on the beverage-making state information indicating that the beverage-making apparatus is in the third state that is after the beverage-making process:
generate a third content comprising at least one of a content related to a review of the beverage made during the beverage-making process, a content for guiding a user to purchase at least one ingredient for the beverage made during the beverage-making process, or a content related to a beverage-making history of the user; and
display, through the display, the third content.

10. The mobile terminal of claim 1, wherein the instruction is provided to the user to make the beverage for the date of the extracted event using the purchased ingredients.

11. A method of providing a content related to beverage-making of a beverage-making apparatus comprising:
receiving beverage-making state information indicating a state of the beverage-making apparatus,
acquiring at least one of schedule information or event information registered to a user from at least one of a schedule application installed in a mobile terminal or a server connected to the mobile terminal, extracting an event corresponding to a predetermined event category from at least one of the schedule information or the event information, calculating a beverage-making start deadline for completing making of a beverage by a date of the extracted event, acquiring a beverage ingredient purchase history of the user, generating a first content including an instruction to make the beverage by the date of the extracted event using the beverage-making apparatus and using purchased ingredients based on the beverage ingredient purchase history, and displaying, through a display, the first content in consideration of the beverage-making state information, wherein the first content includes information on the calculated beverage-making start deadline.

12. The method of claim 11, further comprising:
receiving an input of selecting the first content, and
displaying at least one of detailed information on the extracted event, information related to making the beverage related to the first content, or a purchasing content for purchasing of a beverage recipe package related to the first content, in response to the input of selecting the first content.

13. The method of claim 11, wherein the beverage-making state information comprises information related to whether the beverage-making apparatus is currently performing the beverage-making process.

14. The method of claim 13, wherein the beverage-making state information indicates that the beverage-making apparatus is in one of the first state that is prior to the beverage-making process, a second state that is during the beverage-making process, or a third state that is after the beverage-making process.

15. The method of claim 14, wherein displaying the first content comprises displaying the first content based on the beverage-making state information indicating that the beverage-making apparatus is in the first state that is prior to the beverage-making process.

16. The method of claim 14, wherein, based on the beverage-making state information indicating that the beverage-making apparatus is in the second state that is during the beverage-making process, the beverage-making state information further comprises at least one of information regarding a type or an ingredient of the beverage being made, or information regarding a beverage-making progress degree of the beverage, and wherein the method further comprises, based on the beverage-making state information indicating that the beverage-making apparatus is in the second state that is during the beverage-making process:

generating a second content depending on the type of the beverage being made in the beverage-making process and depending on at least one of the ingredient of the beverage being made or the beverage-making progress degree of the beverage indicated in the beverage-making state information; and displaying the second generated content.

17. The method of claim 16, wherein generating the second content comprises generating the second content comprising information regarding food that is matched to the beverage being made or information regarding the beverage-making progress degree.

18. The method of claim 16, further comprising, based on the beverage-making state information indicating that the beverage-making apparatus is in the third state that is after the beverage-making process:

transmitting, to at least one computer connected to the mobile terminal, information regarding the beverage-making process that is generated after the beverage-making process has completed.

19. The method of claim 14, further comprising, based on the beverage-making state information indicating that the beverage-making apparatus is in the third state that is after the beverage-making process:

generating a third content comprising at least one of a content related to a review of the beverage made during the beverage-making process, a content for guiding a user to purchase at least one ingredient for the beverage made during the beverage-making process, or a content related to a beverage-making history of the user; and displaying the third content.

20. The method of claim 11, wherein the instruction is provided to the user to make the beverage for the date of the extracted event using the purchased ingredients.

* * * * *